United States Patent
Meng et al.

(10) Patent No.: US 11,270,226 B2
(45) Date of Patent: Mar. 8, 2022

(54) HYBRID LEARNING-BASED TICKET CLASSIFICATION AND RESPONSE

(71) Applicant: INTERNATIONAL BUSINESS MACHINES CORPORATION, Armonk, NY (US)

(72) Inventors: Fan Jing Meng, Beijing (CN); Lin Yang, Beijing (CN); Xiao Zhang, Shaanxi (CN); Shi Lei Zhang, Beijing (CN); Jing Min Xu, Beijing (CN); Naga A. Ayachitula, Elmsford, NY (US); Zhuo Su, Taikoo Shing (HK)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 755 days.

(21) Appl. No.: 16/148,393

(22) Filed: Oct. 1, 2018

(65) Prior Publication Data
US 2020/0104752 A1 Apr. 2, 2020

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
CPC .......... G06Q 30/0243; G06Q 30/0224; G06Q 30/0239; H04L 67/22; G06N 20/00; G06F 16/285
See application file for complete search history.

(56) References Cited

U.S. PATENT DOCUMENTS

| | | | | |
|---|---|---|---|---|
| 9,235,812 | B2* | 1/2016 | Scholtes | G06N 5/02 |
| 9,250,993 | B2* | 2/2016 | Mani | G06F 16/285 |
| 9,299,031 | B2* | 3/2016 | Jan | G06N 5/048 |
| 10,298,757 | B2* | 5/2019 | Li | G06Q 30/016 |
| 10,664,777 | B2* | 5/2020 | Volkov | G06Q 10/063116 |
| 10,671,834 | B2* | 6/2020 | Adato | G06F 16/90335 |
| 2014/0278850 | A1* | 9/2014 | Boccuzzi, Jr. | G06Q 30/0208 |
| | | | | 705/14.11 |
| 2016/0196501 | A1* | 7/2016 | Anand | G06F 11/079 |
| | | | | 706/46 |

(Continued)

OTHER PUBLICATIONS

Pattern Recognition—Sergios Theodoridis, Elsevier, 2009, pp. 1-9, 577-594 (Excerpts).*

(Continued)

*Primary Examiner* — David J Stoltenberg
*Assistant Examiner* — Michael I Ezewoko
(74) *Attorney, Agent, or Firm* — Tutunjian & Bitetto, P.C.; Joseph Petrokaitis

(57) ABSTRACT

Systems and methods for ticket classification and response include labeling tickets with a ticket classifier that assigns a ticket label and an associated confidence score to each ticket. Tickets are clustered according to semantic similarity to form ticket clusters. A template associated with each ticket cluster is determined. Templates and the respective ticket clusters are clustered according to semantic similarity to form one or more ticket super-clusters. Tickets that have below-threshold confidence scores are labeled according to the one or more ticket super-clusters. The tickets are automatically responded to.

14 Claims, 7 Drawing Sheets

(56) References Cited

U.S. PATENT DOCUMENTS

2018/0341907 A1* 11/2018 Tucker .............. G06Q 30/0623

OTHER PUBLICATIONS

Agarwal, 2017, IBM Journal of Research and Development.*
AGARWAL_2017_IBM_Journal_of_Research_and_Development, pp. 4.41-4.52.*
Dam, 2013, pp. 1-71.*
Edelman, 2008, chapter 1-chapter 2.*
Goffman, 1974, chapter 1-2.*
Grier, 2005, pp. 1-25.*
Hayles, 2005, pp. 15-38.*
Kuhn, 1962, pp. 1-110.*
Lakoff, 1980, pp. 3-45.*
Mindell, 2015, chapter 1.*
Treffert (2010), Chapter 10.*
Wirth, 1976, Chapter 1.*
Gladney_2007_Springer, pp. 1-299.*
Lintas_2017_Springer, pp. 1-801.*
Qin_2014_Springer, pp. 1-291.*
Villa_2016_Springer, pp. 1-559.*
Xu_2017_Springer, pp. 41-58.*
Chunqiu Zeng et al., Knowledge Guided Hierarchical Multi-Label Classification Over Ticket Data, IEEE Transactions on Network and Service Management, vol. 14, No. 2, Jun. 2017.
Mucahit Altintas et al., Machine Learning Based Ticket Classification in Issue Tracking Systems, Proceeding of the International Conference on Artificial Intelligence and Computer Science (AICS 2014), Sep. 15-16, 2014, Bandung, Indonesia.

* cited by examiner

HYBRID LEARNING-BASED TICKET CLASSIFICATION AND RESPONSE

BACKGROUND

Technical Field

The present invention generally relates to automatic ticket classification and, more particularly, to combined supervised/unsupervised ticket classification and response.

Description of the Related Art

As enterprise computing systems and networks grow larger, the difficulty of managing those systems also increases. Information technology management typically employs a system of "tickets" to track actions from initial reporting to resolution, with tickets being generated by a wide variety of sources that include individual hardware devices, software applications, and human users of the system. Tickets are not limited to problems or defects in the system but are often used for more general tracking of events and information.

Thus, as the size of the enterprise system grows larger, with more components being used in more complicated and interrelated ways, the number of tickets to manage also increases. Manual classification of tickets, where a human operator with subject matter expertise identifies a ticket and forwards it to a responsible party, cannot scale appropriately to handle large volumes of tickets. Existing systems for automatic classification are generally unable to respond to new types of ticket that were encountered during training.

SUMMARY

A method for ticket classification and response includes labeling tickets with a ticket classifier that assigns a ticket label and an associated confidence score to each ticket. Tickets are clustered according to semantic similarity to form ticket clusters. A template associated with each ticket cluster is determined. Templates and the respective ticket clusters are clustered according to semantic similarity to form one or more ticket super-clusters. Tickets that have below-threshold confidence scores are labeled according to the one or more ticket super-clusters. The tickets are automatically responded to.

A ticket classification system includes a ticket labeling module configured to label tickets with a ticket classifier that assigns a ticket label and an associated confidence score to each ticket and to label tickets that have below-threshold confidence scores according to one or more ticket super-clusters. A ticket clustering module is configured to cluster tickets according to semantic similarity to form a plurality of ticket clusters. A template mining module is configured to determine a template associated with each ticket cluster. A template clustering module is configured to cluster templates and the respective ticket clusters according to semantic similarity to form the one or more ticket super-clusters. A response module is configured to automatically respond to the tickets.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide a hybrid ticket classification system that employs both supervised and unsupervised learning to apply labels to tickets. The labels are then used to respond to the tickets in an efficient manner. Rather than relying solely on a simple rule-based system for classification, some embodiments of the present invention identify tickets that are not labeled with a high degree of confidence and use a multi-tiered clustering approach to group similar tickets together. This allows the present embodiments to provide labels for tickets that would otherwise have otherwise necessitated manual intervention and also identifies new classes of tickets that have not yet been encountered.

Figure 1:
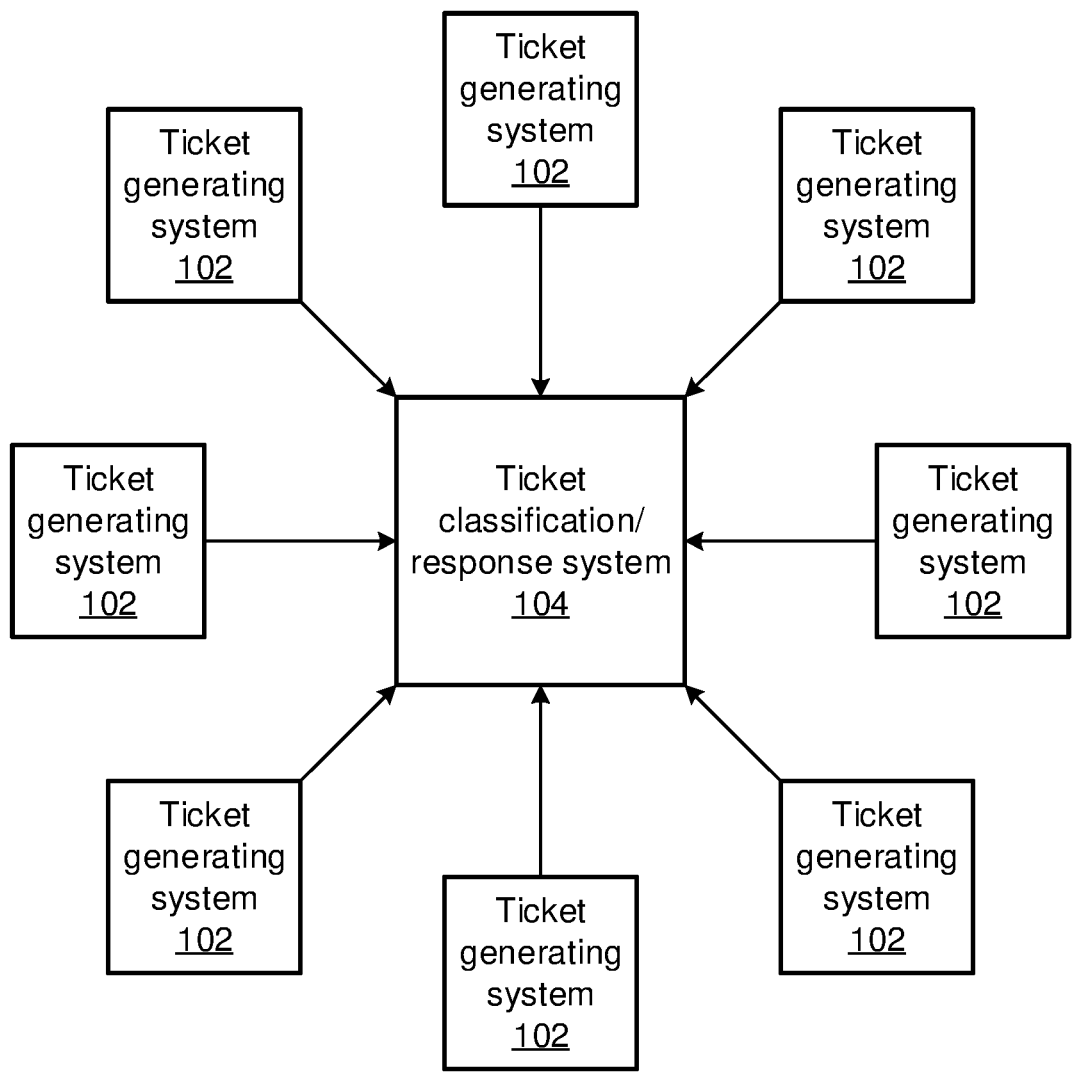
FIG. 1 is a block diagram of a ticket handling system that includes ticket generating systems and a ticket classification/response system that processes and responds to the tickets in accordance with an embodiment of the present invention.

Referring now to the drawings in which like numerals represent the same or similar elements and initially to FIG. 1, an enterprise system is shown that includes a large number of ticket generating systems 102. Each ticket generating system 102 may represent a discrete device, a group of devices, a software component, or a user manually creating a ticket through an interface. Exemplary ticket generating systems include desktop computers, servers (e.g., web servers, database servers, etc.), dedicated devices such as sensors, automatic security systems, network security systems, and any other system that might detect and report an event that necessitates further action. Such events may include, for example, a storage device running out of storage space, a malfunction in a physical system such as a cooling system, a request for implementation of a new feature, a bug report, the unexpected shutdown of a software service, unexpected traffic indicative of an unauthorized intrusion, etc.

These tickets are all sent to a ticket classification/response system 104. In a large enterprise, there may be multiple such systems that operate in a coordinated, decentralized fashion to classify and respond to tickets. The classification/response system 104 uses a combination of supervised and unsupervised learning to label tickets and then forwards the tickets to an appropriate responder or, in some embodiments, responds to the tickets directly. Thus, the classification/response system 104 may automatically respond to a ticket by an action such as, e.g., changing a system policy or configuration, changing a security policy or configuration, automatically contacting a user with information relevant to their problem, triggering an arbitrary programmed action responsive to the occurrence of a particular condition, escalating a ticket to a human operator's attention, or forwarding a ticket to an appropriate queue for later handling.

It is specifically contemplated that the classification/response system 104 uses a first level of supervised learning to classify tickets according to known labels and associated patterns. A set of training data is used that may be, e.g., manually classified according to a set of predetermined ticket labels. The classification/response system 104 determines classifiers using an appropriate machine learning process based on the set of training data. These classifiers are used as a first step in ticket labeling, where any ticket that is classified with a known label at an above-threshold confidence level is appropriately labeled and responded to.

For those tickets that do not have an above-threshold confidence for any label, a second step uses clustering to group tickets together according to, e.g., semantic similarities. This process can identify an appropriate label for an unlabeled ticket according to labeled tickets that it has been grouped together with. The process can also identify tickets and groups of tickets that do not match any label and represent a new type or format of ticket. The classification/response system 104 identifies a template for the new type of ticket that can be used for future classification. The new type of ticket is labeled with a placeholder label and is flagged for review.

It should be understood that the network illustrated in FIG. 1 may be embodied as a number of discrete hardware systems or may, alternatively, be implemented within a single system. In single-system embodiments, the ticket generating systems 102 and the ticket classification/response system 104 may be implemented as different hardware and/or software components that are housed within a single device. In a distributed system, multiple distinct ticket generating systems 102 communicate with the ticket classification/response system 104 via a network or other communication means, including wired and/or wireless communications. The ticket generating systems 102 may be separated by large geographic distances or may be housed together, e.g., within a data center. In some embodiments, ticket handling may be handled in cloud-based implementation, with the ticket classification/response system 104 itself being distributed over multiple different computing systems and physical locations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
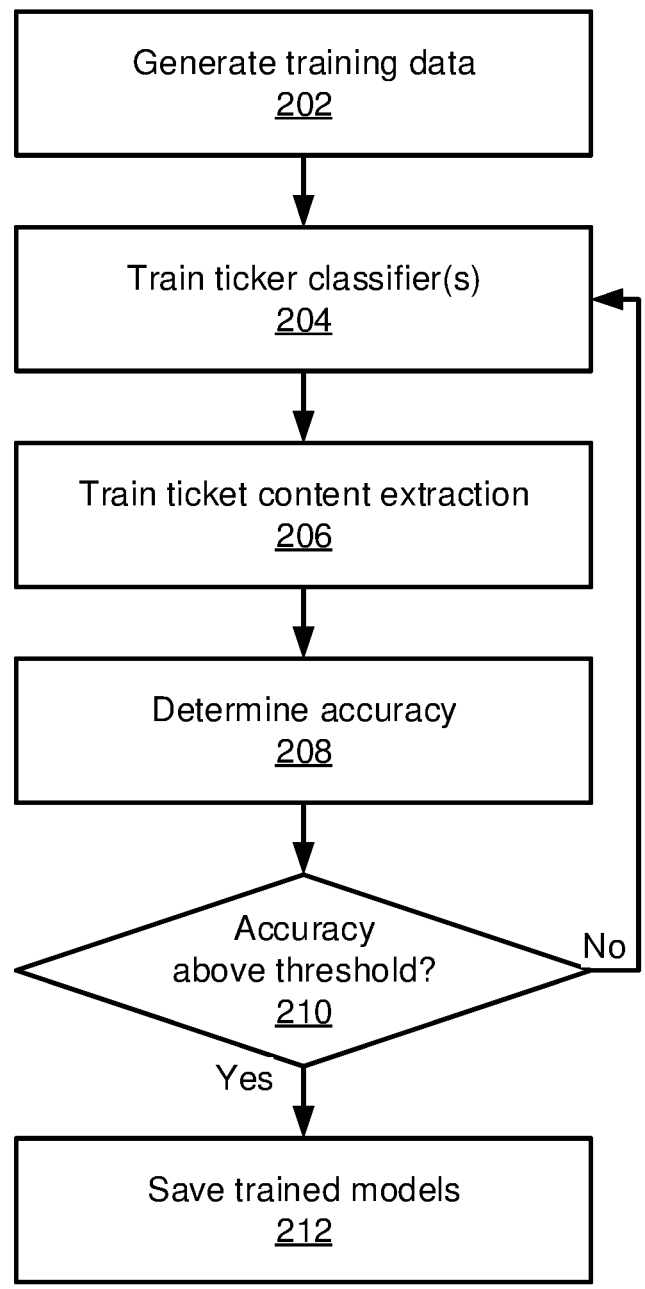
FIG. 2 is a block/flow diagram of a method for training a ticket classifier and ticket extraction machine learning model in accordance with an embodiment of the present invention.

Referring now to FIG. 2, a training process is shown. Block 202 generates training data. It is specifically contemplated that the training data represents a set of sample tickets that have been labeled according to ticket classification and according to contents. The training data is divided into two portions—a first portion that is used for training and a second portion that is used for verification.

Block 204 trains one or more ticket classifiers. There may be, for example, a separate classifier for each known ticket classification, such that a ticket may have multiple classifications. In alternative embodiments, a single classifier may be used to determine a single appropriate ticket classification. Any appropriate machine learning model may be used to train the classifiers including, e.g., natural language classification or artificial neural networks.

Block 206 then trains a ticket content extraction model. The content extraction model characterizes the content of tickets in some repeatable fashion, such that tickets may be compared using the content extraction model to determine a degree of similarity. An exemplary content extraction model may use an n-gram analysis to find strings of words within a ticket. This output can be compared to the content extraction output for other tickets to determine a semantic similarity or other form of similarity. It should be noted that, although block 204 is shown as being performed before block 206, in fact the order of these steps can be reversed. In other embodiments, blocks 204 and 206 can be performed in parallel.

Block 208 determines an accuracy of the training by running the ticket classifier and content extraction model on a second portion of training data. In the second portion of training data, the output of the classifier and the content extraction model are compared to a known-correct outcome for each ticket. An accuracy score is determined for the ticket classifier(s) and for the content extraction model (e.g., as a percentage of correct outputs). Block 210 determines whether the accuracies are sufficiently high by comparing the accuracy scores to a threshold. If block 210 finds that one or both of the accuracy scores is below the threshold processing returns to block 204 for further training and refinement. Otherwise, block 212 saves the trained ticket classifier(s) and the content extraction model. It should be noted that, although training of the ticket classifier(s) and the content extraction model are shown as being performed at the same time, these two training processes can be performed separately instead.

Figure 3:
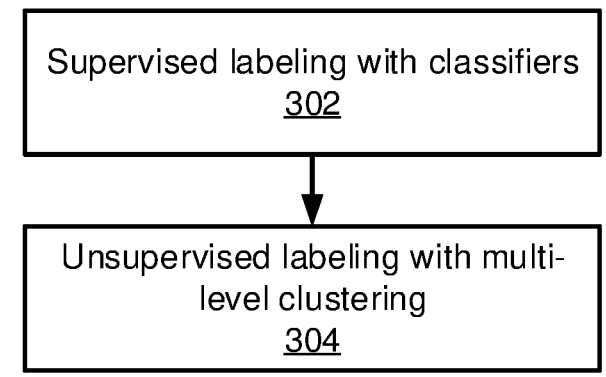
FIG. 3 is a block/flow diagram of a method for labeling tickets using a first, supervised stage and a second, unsupervised stage with multi-level clustering in accordance with an embodiment of the present invention.

Referring now to FIG. 3, a ticket labeling process is shown. Block 302 performs supervised classification using the trained classifier from block 204. This classification process finds a best label for an input ticket and assigns a confidence value that represents a likelihood that the classification is correct. For any tickets that have been classified with a confidence below the threshold value, block 304 performs unsupervised labeling with a multi-level clustering process. Block 304 clusters tickets according to their semantic similarity and then finds templates for the clusters of tickets. Block 304 uses the templates to form super-clusters of the clustered tickets. In this fashion, block 304 can identify labels for tickets with a low confidence and can, furthermore, identify entirely new categories of tickets.

Figure 4:
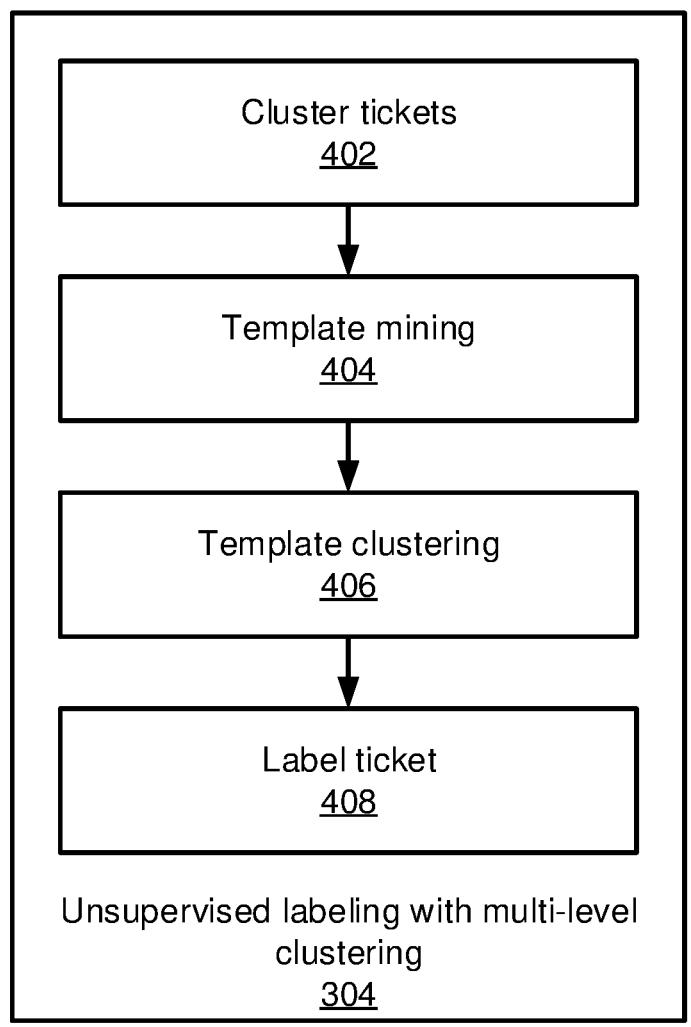
FIG. 4 is a block/flow diagram of a method for unsupervised labeling of tickets with multi-level clustering in accordance with an embodiment of the present invention.

Referring now to FIG. 4, additional detail on the unsupervised labeling of block 304 is shown. Block 402 performs clustering on a set of tickets. The clusters may include an input ticket along with a set of training tickets. Additional tickets that have been labeled since operation began may also be included. It is specifically contemplated that each ticket may be converted to a vector of values in an n-dimensional space. These vectors can then be compared to one another by an appropriate distance metric to find vectors that are close to one another in the n-dimensional space, with any appropriate clustering process being used to identify groups of tickets that are similar to one another. One exemplary clustering process is k-means, but it should be understood that any appropriate clustering process may be used instead.

Block 404 performs template mining on each cluster, determining a characteristic template that represents all of the tickets in a given cluster. Consider, for example, the following three exemplary tickets that have been clustered together:

Job MCDDA9UL (0397581) abended with code 3902. Operation=0023, IA=, APPL=MCDDPC42#000

Job MCDDA9UL (0088481) abended with code 3902. Operation=0023, IA=, APPL=MCDDPC42#000

Job MCDDA9UL (0857622) abended with code 3902. Operation=0023, IA=, APPL=MCDDPC42#000

In this example, the three tickets differ only by the number in parentheses. Thus, one exemplary template to represent this cluster of tickets would be:

Job MCDDA9UL (.*) abended with code 3902. Operation=0023, IA=, APPL=MCDDPC42#000

The invariant portion of the tickets has been retained, but the variable portion has been replaced by an appropriate regular expression, ".*", which will match any number of characters in its place. More complicated templates may present more complicated patterns, such that different regular expressions would be needed to accurately represent all of the tickets in the cluster. It should be understood that regular expressions are only one way to represent the cluster templates and that any other appropriate expression may be used instead.

Mining a template for each cluster of tickets, block 406 performs template clustering to find templates that are similar to one another. Following the above example, different jobs that have different code values may be grouped together if the general forms of their respective templates are the same. In clustering the templates, block 406 joins together the various clusters that those templates represent, forming super-clusters.

Using the super-clusters found by block 406, block 408 performs ticket labeling. In cases where at least some of the tickets in a super-cluster are labeled, any unlabeled tickets in the super-cluster may be given similar labels. In cases where no tickets in a super-cluster are labeled, then a new label may be generated and stored for future classification actions.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
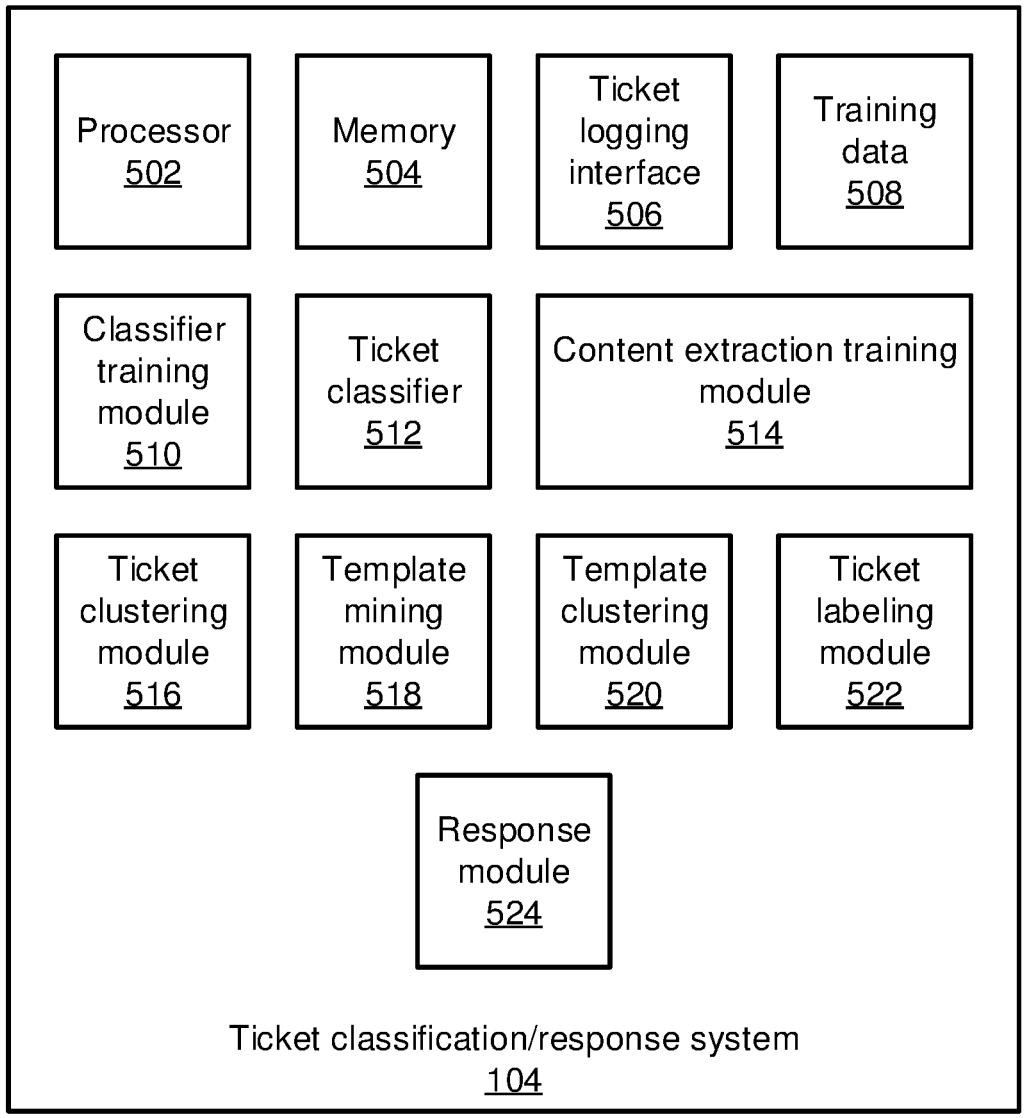
FIG. 5 is a block diagram of a ticket classification and response system in accordance with an embodiment of the present invention.

Referring now to FIG. 5, additional detail regarding the structure of the ticket classification/response system 104 is shown. The system 104 includes a hardware processor 502 and memory 504. A ticket logging interface 506 may include a hardware network interface that is configured to receive information from ticket generating systems 102. The ticket generating systems 102 may communicate with the ticket logging interface 506 via a wired or wireless network or, in embodiments where the ticket generating systems 102 and the ticker classification/response system 104 are housed within a single device, via an internal bus or other communications path. The ticket logging interface 506 thus includes a hardware communications interface that is configured to receive tickets from the ticket generating systems 102 and logs those received tickets in memory 504. The memory 504 furthermore includes a set of training data 508 that represents a set of pre-classified tickets.

The ticket classification/response system 104 further includes one or more functional modules that may, in some embodiments, be implemented as software that is stored in memory 504 and is executed by hardware processor 502. In other embodiments, one or more of the functional modules may be implemented in the form of discrete hardware components in the form of, e.g., application-specific integrated chips or field programmable gate arrays.

A classifier training module 510 trains a ticket classifier 512 using the training data 508. Training the ticket classifier 512 may be performed according to any appropriate machine learning process, using a first portion of the training data 508 to train the ticket classifier 512 and a second portion of the training data 508 to perform verification and correction of the ticket classifier 512. A content extraction training module 514 trains a content extraction model that identifies characteristics of tickets based on, e.g., keywords and other content.

The ticket classifier 512 is used by ticket labeling module 522 to make a pass at classifying tickets. The ticket classifier 512 assigns labels to the tickets with an associated confidence value. If the ticket labeling module 522 finds the confidence value of a particular label to exceed a threshold value, the label is stored in memory 504.

If not, then ticket clustering module 516 identifies similarities between tickets, including previously labeled tickets and the training data 508. Ticket clustering module 516 can, for example, represent the tickets as vectors in an n-dimensional space and cluster the tickets within that space using any appropriate clustering process. Template mining module 518 then identifies templates of the ticket clusters that each represent invariant characteristics shared by the tickets in a given cluster. Template clustering module 520 then clusters the templates (and their associated tickets) according to similarity, creating super-clusters of tickets. Ticket labeling module 522 uses the super-clusters of tickets to identify labels for currently unlabeled tickets and to identify groups of tickets that represent new patterns and should therefore have a new label. It should be understood that training of the ticket classifier 512 may be repeated by classifier training module 510 after the identification of a new label, such that incoming tickets that match the new pattern can be rapidly classified.

A response module 524 performs some appropriate response to labeled tickets. The response may include automatically addressing the ticket by, e.g., automatically acting to resolve the ticket, responding to a person issuing the ticket, forwarding the ticket to a human operator for resolution, or a combination of these, depending on the nature of the ticket.

Figure 6:
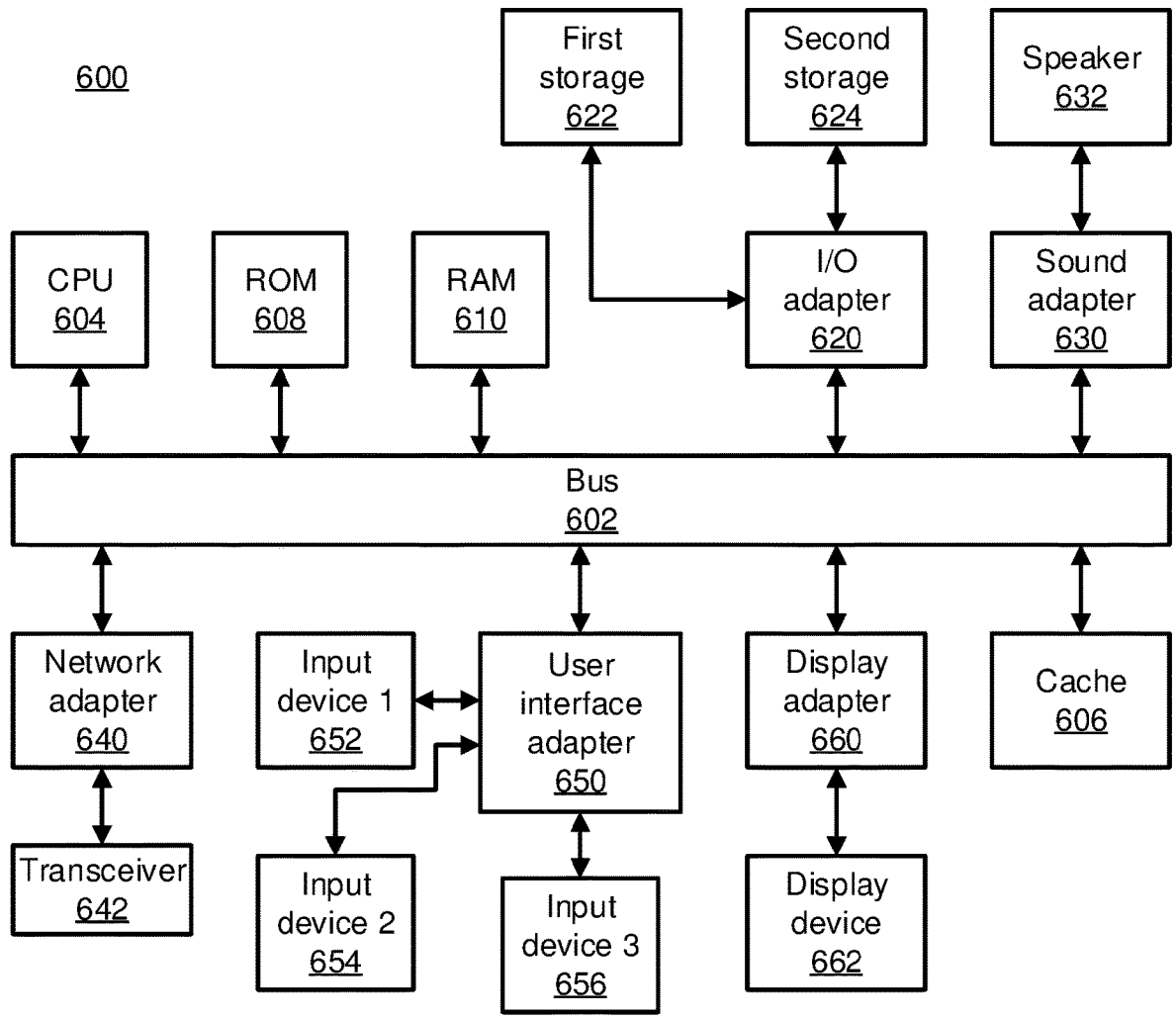
FIG. 6 is a block diagram of a processing system suitable for implementing the ticket classification and response system in accordance with an embodiment of the present invention.

Referring now to FIG. 6, an exemplary processing system 600 is shown which may represent the ticker classification/response system 104. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Figure 7:
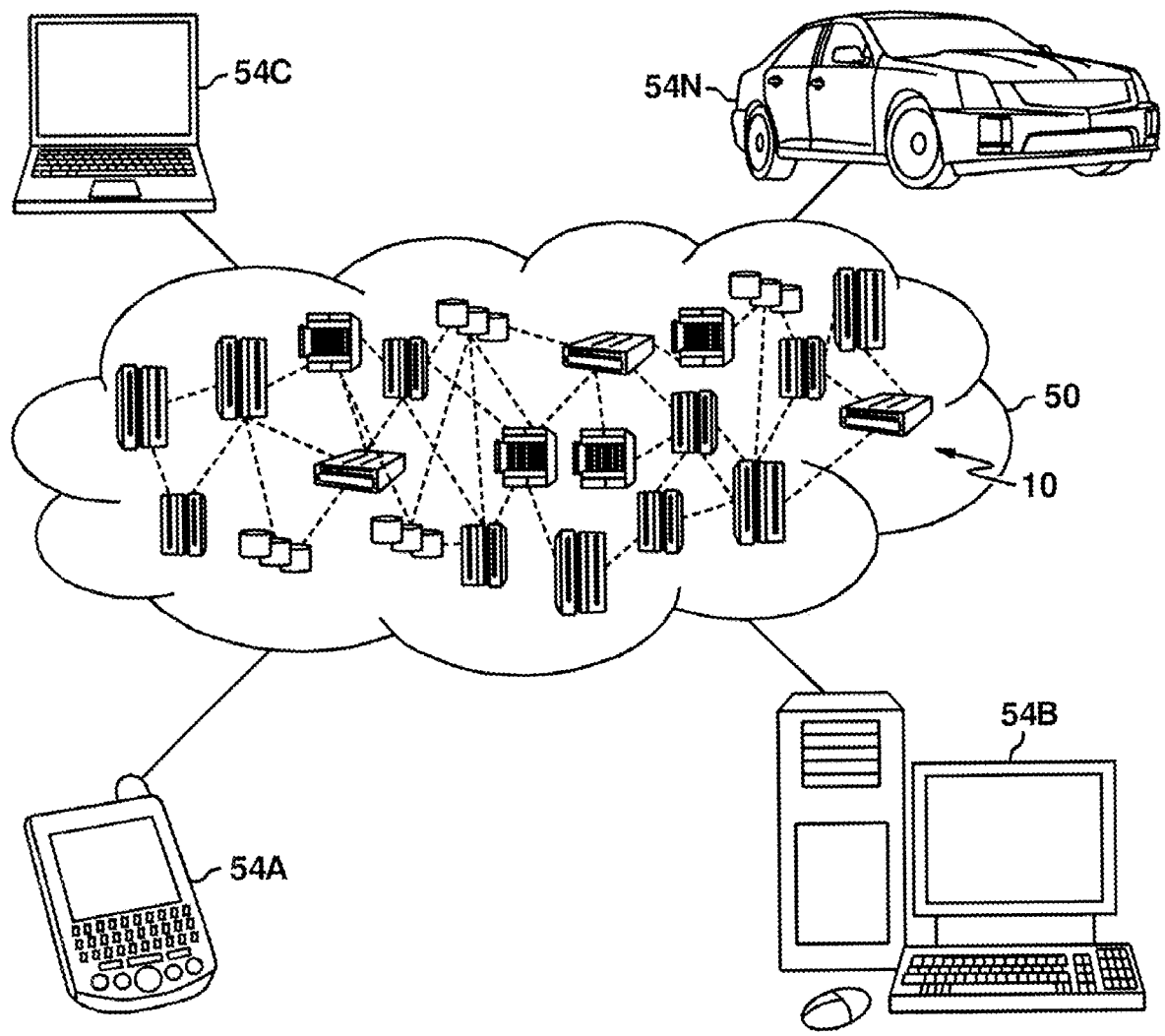
FIG. 7 is a diagram of a cloud computing environment according to the present principles.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. are intended to be illustrative only and that computing nodes 10 and cloud computing environment 50 can communicate with any type of computerized device over any type of network and/or network addressable connection (e.g., using a web browser).

Figure 8:
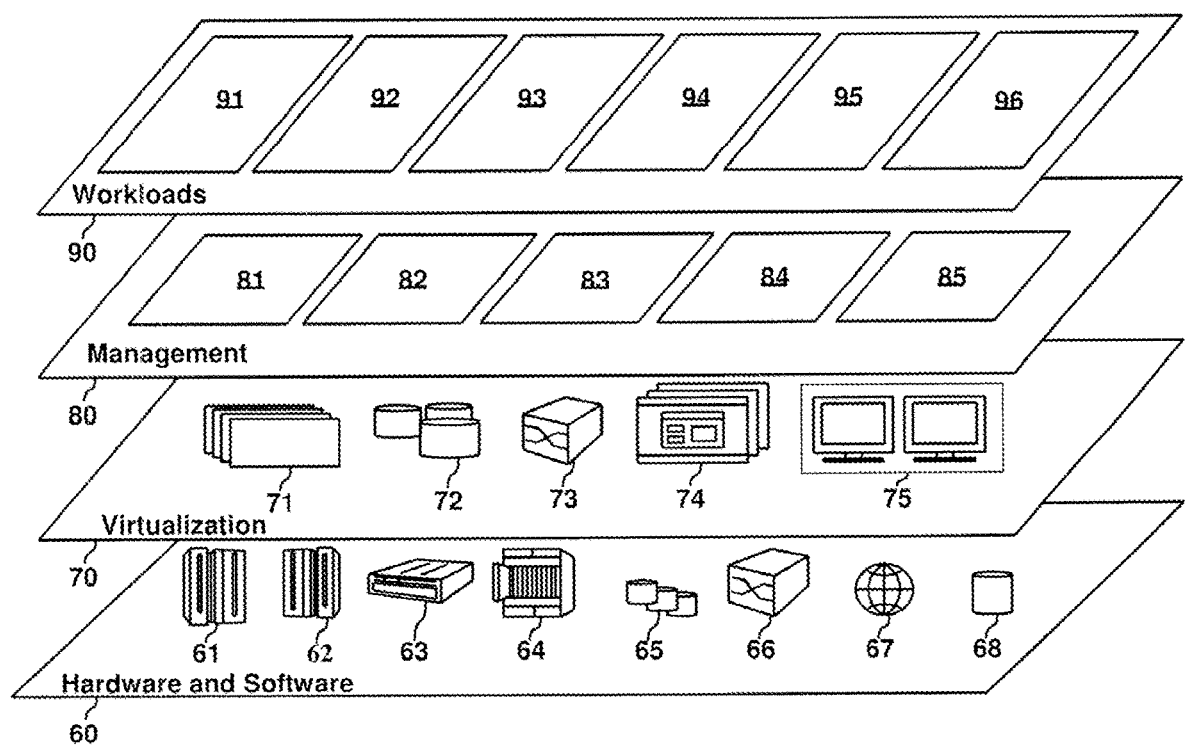
FIG. 8 is a diagram of abstraction model layers according to the present principles.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ticket classification and response 96.

Having described preferred embodiments of hybrid learning-based ticket classification and response (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for ticket classification and response, comprising:
    labeling tickets with a supervised-learning ticket classifier that assigns a ticket label and an associated confidence score to each ticket;
    clustering tickets according to semantic similarity to form a plurality of ticket clusters;
    determining a template associated with each ticket cluster, including an invariant portion and one or more indicators for locations of variable portions of each ticket cluster;
    clustering templates and the respective ticket clusters according to semantic similarity to form one or more ticket super-clusters, including representing each of the templates as a respective vector in an n-dimensional space and clustering the vectors;
    labeling tickets that have below-threshold confidence scores using unsupervised learning, according to the one or more ticket super-clusters; and
    automatically responding to the tickets.

2. The computer-implemented method of claim 1, wherein clustering the tickets comprises representing each of the tickets as a respective vector in an n-dimensional space and clustering the vectors.

3. The computer-implemented method of claim 1, wherein labeling tickets that have below-threshold confidence scores comprises labeling the below-threshold tickets according to a label shared by other tickets in the below-threshold tickets' respective super-clusters.

4. The computer-implemented method of claim 1, wherein labeling tickets that have below-threshold confidence scores comprises applying a placeholder label to below-threshold tickets that do not share a super-cluster with a labeled ticket.

5. The computer-implemented method of claim 1, wherein automatically responding to the tickets comprises an action selected from the group consisting of changing a system policy or configuration, changing a security policy or configuration, automatically contacting a user with information relevant to their problem, triggering an arbitrary programmed action responsive to the occurrence of a particular condition, escalating a ticket to a human operator's attention, or forwarding a ticket to an appropriate queue for later handling.

6. The computer-implemented method of claim 1, further comprising training the ticket classifier using a set of training data that established known correspondences between tickets and labels.

7. A non-transitory computer readable storage medium comprising a computer readable program for ticket classification and response, wherein the computer readable program when executed on a computer causes the computer to perform the steps of:
- labeling tickets with a supervised-learning ticket classifier that assigns a ticket label and an associated confidence score to each ticket;
- clustering tickets according to semantic similarity to form a plurality of ticket clusters;
- determining a template associated with each ticket cluster, including an invariant portion and one or more indicators for locations of variable portions of each ticket cluster;
- clustering templates and the respective ticket clusters according to semantic similarity to form one or more ticket super-clusters, including representing each of the templates as a respective vector in an n-dimensional space and clustering the vectors;
- labeling tickets that have below-threshold confidence scores using unsupervised learning, according to the one or more ticket super-clusters using a processor device; and
- automatically responding to the tickets.

8. A ticket classification and response system, comprising:
a hardware processor; and
a memory that stores a computer program product, which, when executed by the hardware processor, causes the hardware processor to:
- label tickets with a supervised-learning ticket classifier that assigns a ticket label and an associated confidence score to each ticket;
- cluster tickets according to semantic similarity to form a plurality of ticket clusters;
- determine a template associated with each ticket cluster, including an invariant portion and one or more indicators for locations of variable portions of each ticket cluster;
- cluster templates and the respective ticket clusters according to semantic similarity to form one or more ticket super-clusters, including representing each of the templates as a respective vector in an n-dimensional space, the vectors being clustered;
- label tickets that have below-threshold confidence scores using unsupervised learning, according to the one or more ticket super-clusters; and
- a response module configured to automatically respond to the tickets.

9. The system of claim 8, wherein the ticket clustering module is further configured to represent each of the tickets as a respective vector in an n-dimensional space and to cluster the vectors.

10. The system of claim 8, wherein the ticket labeling module is further configured to label the below-threshold tickets according to a label shared by other tickets in the below-threshold tickets' respective super-clusters.

11. The system of claim 8, wherein the ticket labeling module is further configured to apply a placeholder label to below-threshold tickets that do not share a super-cluster with a labeled ticket.

12. The system of claim 8, wherein the response module is further configured to perform an action selected from the group consisting of changing a system policy or configuration, changing a security policy or configuration, automatically contacting a user with information relevant to their problem, triggering an arbitrary programmed action responsive to the occurrence of a particular condition, escalating a ticket to a human operator's attention, or forwarding a ticket to an appropriate queue for later handling.

13. The system of claim 8, further comprising a classifier training module configured to train the ticket classifier using a set of training data that established known correspondences between tickets and labels.

14. The method of claim 1, wherein the one or more indicators include a regular expression.

* * * * *